W. J. SHRIVER AND C. K. HEASLEY.
TIRE RETREADING FORM AND METHOD OF CONSTRUCTING THE SAME.
APPLICATION FILED JUNE 21, 1919.

1,330,958. Patented Feb. 17, 1920.

Inventors:
William J. Shriver
Chester K Heasley
by Morsell + Keeney
Attorneys.

UNITED STATES PATENT OFFICE.

WILLIAM J. SHRIVER, OF MILWAUKEE, WISCONSIN, AND CHARLES K. HEASLEY, OF CHICAGO, ILLINOIS.

TIRE-RETREADING FORM AND METHOD OF CONSTRUCTING THE SAME.

1,330,958.    Specification of Letters Patent.    Patented Feb. 17, 1920.

Application filed June 21, 1919. Serial No. 305,780.

*To all whom it may concern:*

Be it known that we, WILLIAM J. SHRIVER and CHARLES K. HEASLEY, citizens of the United States, and residents, respectively, of Milwaukee and Chicago, in the counties of Milwaukee and Cook and States of Wisconsin and Illinois, have invented new and useful Improvements in Tire - Retreading Forms and Methods of Constructing the Same, of which the following is a description, reference being had to the accompanying drawings, which are a part of this specification.

The present invention relates to certain new and useful improvements in tire retreading forms and the method of constructing the same.

Tire retreading forms now in everyday use are cast and in section, which makes them very undesirable in that they are bulky and extremely heavy. Hence, with these inherent objections in mind our invention has for its primary object to provide an extremely light tire retreading form which will at the same time possess the necessary strength and flexibility.

Another object of this invention is to provide a tire retreading form in which the wall between the heating chamber and the tire tread chamber will be thin in order that the heat may be quickly transmitted from the heating chamber to the tire.

A further object of this invention is to provide a form of the class described in which the wall of the tire receiving chamber will be projected or extended beyond the heating chamber so that the heat applied to the tire will be gradually reduced.

With the above and other objects in view which will appear as the description proceeds, our invention resides in the novel construction, combination and arrangement of parts, substantially as hereinafter described and more particularly defined in the appended claims, it being understood that such changes in the precise embodiment of the herein disclosed invention may be made as come within the scope of the claims.

Figure 2:
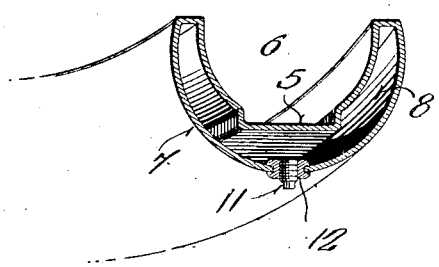
Figure 1:
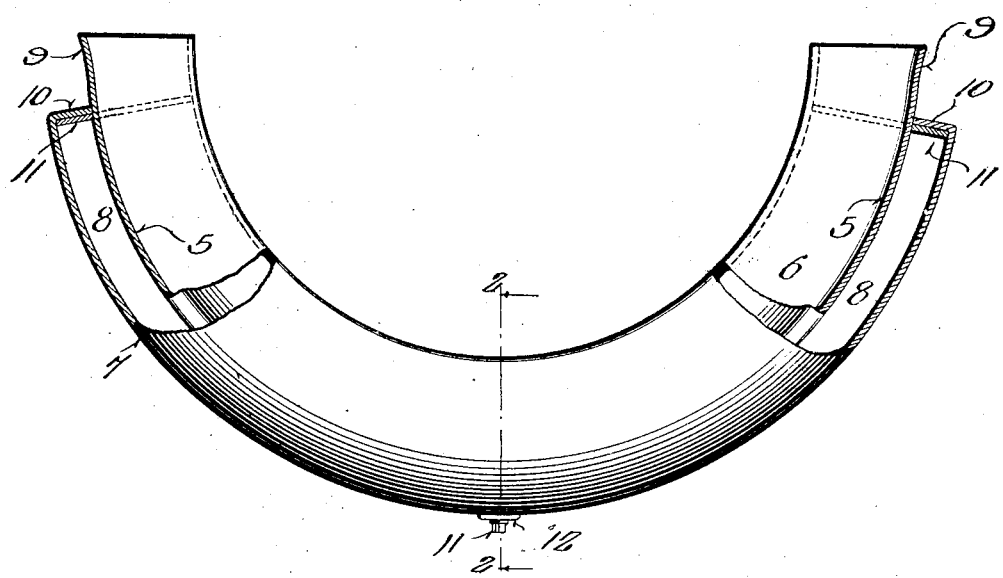

In the accompanying drawing we have illustrated one complete example of the physical embodiment of our tire mold constructed according to the best mode we have so far devised, and in which:

Figure 1 is a side view of a section of a tire retreading mold constructed in accordance with our method, parts being broken away and in section to more clearly illustrate the details of construction, and Fig. 2 is a sectional view taken through Fig. 1 on the line 2—2.

Referring now more particularly to the accompanying drawing in which like numerals designate like parts throughout the several views:

In constructing a tire retreading mold in accordance with our method, a length of seamless metal tubing is drawn and shaped to any sector of a circle desired, and the inner portion of the wall is then directed inwardly as at 5 to provide a tire tread receiving chamber 6, the wall 5 defining, with the remaining wall 7 of the tube, a heating chamber 8. The wall 5 may be shaped or pressed to conform with any desired style of tire tread, and this being merely a structural detail, the same will not be further described.

The wall 5 has its ends projected beyond the ends of the wall portion 7 as at 9, and the ends 9 are slightly flared outwardly to assist in placing the mold upon a tire. The wall 7 has its ends directed inwardly as at 10 to engage against a partition 11 to close the ends of the heating chamber 8. The partitions 11 and ends 10 form an air tight joint with the adjacent portion of the wall 5.

The heating chamber 8 is supplied with live steam or any other desired form of heating medium through an aperture 12 communicating therewith. The aperture 12 is threaded and is normally closed by means of a threaded plug 11 which is removed when it is desired to couple the heat supplying means with the heating chamber.

The end extensions 9, while they serve to provide means for assisting in placing the form upon a tire, they also provide means for gradually reducing the heat at the ends. In other words, were the tread receiving chamber to end with the heating chamber, a portion of the tire tread outwardly thereof would be in a more or less plastic or soft condition when the form is in use. This is prevented by extending the tire tread receiving chamber beyond the ends of the heating chamber as described..

What we claim as our invention is:

1. A tire retreading device formed from a single length of seamless tubing shaped to provide a tire tread receiving chamber and a heating chamber.

2. A tire retreading device formed from a single length of seamless tubing shaped to provide a tire tread receiving chamber, and a heating chamber surrounding the tire tread receiving chamber.

3. A tire retreading device formed from seamless tubing shaped to provide a tire tread receiving chamber and a heating chamber surrounding the tire tread receiving chamber, the walls of the tire tread receiving chamber being extended beyond the heating chamber.

4. A tire retreading device formed from seamless tubing shaped to provide a tire tread receiving chamber and a heating chamber surrounding the tire tread receiving chamber, the walls of the tire tread receiving chamber being extended beyond the heating chamber, and a partition closing the ends of the heating chamber.

5. The hereindescribed method of producing a tire retreading device made from seamless tubing, which consists in shaping the tubing in any sector of a circle desired, and then directing the inner portion of the tubing sector in to a point spaced from the inner wall of the remaining portion of the tubing.

6. The hereindescribed method of producing a tire retreading device made from seamless tubing, which consists in shaping the tubing in any sector of a circle desired, then directing the inner portion of the tubing sector in to a point spaced from the inner wall of the remaining portion of the tubing to provide a heating chamber and a tread receiving chamber, and then closing the ends of the heating chamber thus formed.

7. The hereindescribed method of producing a tire retreading device made from seamless tubing, which consists in shaping the tubing in any sector of a circle desired, then directing the inner portion of the tubing sector in to a point spaced from the inner wall of the remaining portion of the tubing to provide a heating chamber and a tread receiving chamber, then closing the ends of the heating chamber thus formed, and then shaping the wall of the tread receiving chamber to conform to the desired shape of tread.

In testimony whereof we affix our signatures.

WILLIAM J. SHRIVER.
CHARLES K. HEASLEY.